Sept. 29, 1953  J. A. CAMERON  2,653,387
LAYOUT INSTRUMENT
Filed May 6, 1949
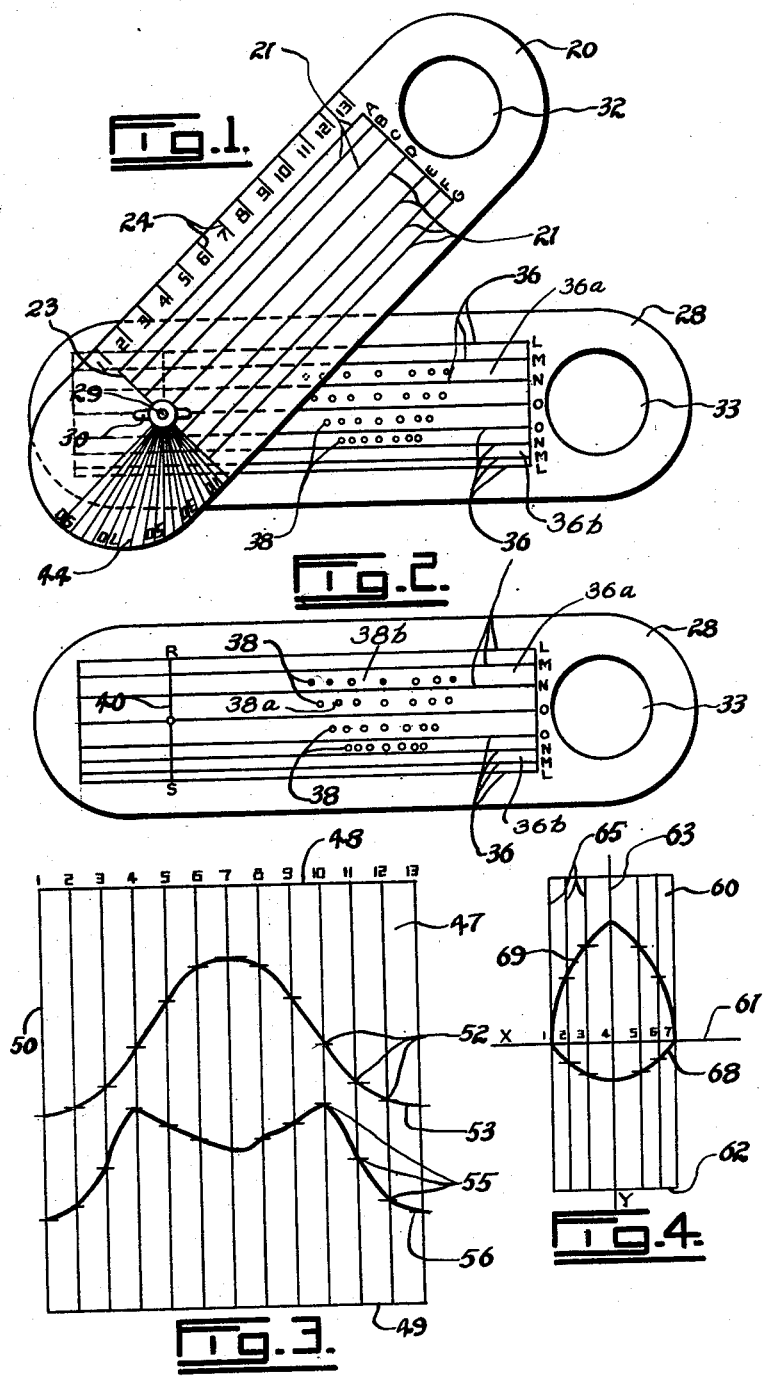
INVENTOR
JAMES ARTHUR CAMERON
BY
Fetherstonhaugh & Co.
ATTORNEYS Patented Sept. 29, 1953

2,653,387

UNITED STATES PATENT OFFICE 2,653,387

LAYOUT INSTRUMENT

James Arthur Cameron, Steveston, British Columbia, Canada

Application May 6, 1949, Serial No. 91,691

9 Claims. (Cl. 33—75)

This invention relates to a lay-out instrument for pipes and the like.

This instrument may be designed for laying out templates for the ends of intersecting pipes and/or the holes at the point of intersection of the pipes, in which case due allowance is made for the thickness of the pipe materials and for the thickness of the template material, or it may be made mathematically exact for use by draftsmen in pipe drawings.

This instrument consists of an arm having a plurality of spaced parallel lines extending longitudinally thereof representing equally spaced lines on a pipe surface curved transversely of said lines. This arm is pivotally mounted on a base, suitable means being provided for removably retaining the arm in any adjusted position in relation to the base. If the instrument is to be used for laying out templates for the parts of a pipe elbow, the base must have at least one straight line thereon. This line may be inscribed on the base or it may be an edge thereof. If the instrument is to be used for laying out templates for the end of a pipe lying at an angle to and connected to another pipe, the base is provided with a plurality of spaced parallel lines extending longitudinally thereof representing equally spaced lines on a pipe surface curved transversely of said line. If desired, the instrument may be used for laying out a template for cutting the hole in a pipe at a point where two pipes intersect. In this case, the base is provided with a line lying at right angles to the other lines thereof and in line with the pivot of the arm. If desired, the arm may be provided with protractor graduations centered on its pivot point and it may have graduations along an edge thereof representing the width of a stretch-out for a pipe of a given diameter and the points for the ordinate lines for the stretch-out.

The main object of this invention is provision of an instrument which will enable unskilled persons to lay out templates for pipe joints and the holes at said joints.

Another object is the provision of a lay-out instrument for pipes and the like which will enable the necessary templates to be laid out in much less time and much more accurately than is possible with the methods now in common use.

A further object is the provision of a lay-out instrument which may be used for the joints of pipes of several sizes and for a joint at any practical angle up to 90°.

Yet another object is the provision of a lay-out instrument which may be quickly and easily changed for pipes of different sizes.

An example of this invention is illustrated in the accompanying drawings, in which, Figure 1 is a plan view of the instrument set at a 45° angle, Figure 2 is a plan view of the base by itself, Figure 3 is a stretch-out showing the lines which will be used for making templates for the ends of pipes coming in at 60° and 90°, respectively, to another pipe, and Figure 4 is a stretch-out showing the lines which will be used for cutting a hole in a pipe at a pipe joint.

Referring to the drawings, 20 is an arm which is preferably elongated as shown. This arm may be transparent and is provided with a plurality of spaced parallel lines 21 extending longitudinally thereof which represent equally spaced lines on a pipe surface curved transversely of said lines. The lines get closer to each other from the centre line towards each side of the arm, since this is the way equally spaced lines on a pipe surface appear when looked at from the side. For convenience during use of the instrument, these lines may be lettered A, B, C, D, E, F, G, as shown. Line D is a central line, and there are two groups of equal numbers of side lines parallel therewith and located on opposite sides thereof. Lines A, B and C form a group on one side, and lines E, F and G a group on the other side of the central line D. The lines on this arm are laid out for a pipe of a given diameter say, for example, 2 inches. In this case, the lines nearest the opposite sides of the arm are 2 inches apart. The arm may also have graduations 24 along an edge thereof. These graduations are equally spaced and may be numbered 1 to 13 and the distance between the marks numbered 1 and 13 is equal to the circumference of the pipe for which the arm is intended, which in this example, is a 2 inch pipe.

The arm 20 is pivotally mounted on a base 28 which is preferably elongated and may be the same size and shape as the arm. The pivot point for the arm is preferably close to but spaced from one end of both the arm and the base, and it is located on the central line D of the arm. All of the lines 21 extend longitudinally of the arm substantially at right angles to a transverse line 23 running through the pivot point of said arm. Suitable means is provided for permitting the arm to pivot in relation to the base and for holding the arm in any adjusted position. This may be done by a bolt 29 and wing nut 30, said bolt extending through holes in the base and arm at the pivot point of the latter. If desired, the arm and the case may be provided with relatively large holes 32 and 33, respectively adjacent their corresponding ends for convenience in manipulating the instrument.

The base 28 must have at least one straight line thereon. This line may be inscribed on the base or it may be an edge thereof. In this example, the base has at least one set of spaced parallel lines 36 representing equally spaced lines on a pipe surface curved transversely of said lines. In this example, the base is provided with a set of lines 36 adjacent each of its opposite edges. If desired, there may be a set of these lines adjacent each of the base edges on the opposite faces thereof. Each set of lines is laid out for a pipe of a given diameter. In the illustrated example, the set of lines 36a is for a 2 inch pipe, while the set of lines 36b is for a 3 inch pipe. The lines of each set 36 are suitably designated, such as by letters L, M, N, O—L being the line closest to the base edge and O the line farthest away therefrom.

If desired, the base 28 may be provided with a plurality of lines 38 of spaced holes, there being one line of holes for each set of lines 36 on the opposite faces of the base. The line of holes 38a may be for the set 36a, and the line of holes 38b for the set 36b. The remaining two lines of holes are for sets 36 on the opposite face of the base. The distance between the opposite end holes of each line 38 is equal to the diameter of the pipe represented by the corresponding set of lines 36. The spacing of the holes in each line is the spacing of the ordinate lines of a stretch-out for a pipe with a diameter equal to the length of that particular line of holes. The base may also be provided with a line 40 on each of its opposite faces which crosses the sets of lines 36 at right angles thereto and is in line with the pivot point of the arm and the base.

For convenience, this line may be lettered R–S for each set 36.

The arm 20 may be provided with protractor graduations 44 at the pivot thereof, said graduations being centered on the pivot point of the arm 20 and extend from 0° to 90°. The 0° graduation lies at right angles to the lines 21 on the arm, while the 90° graduation lies parallel to said lines. When it is desired to set the arm at a certain angle to the base, the arm is swung until the graduation 44 indicating that angle coincides with the line 40 on the base.

When it is desired to make a template for the end of a 2 inch pipe coming in at any practical angle up to 90° to another pipe, a stretch-out 47 is drawn on the material from which the template is to be cut. Spaced parallel lines 48 and 49 are drawn a suitable distance apart. A line 50 is drawn at right angles to the lines 48 and 49 at one side of the lay-out. Then the points numbered 1 to 13 are laid out on one of the lines 48 or 49 and lines are drawn therethrough parallel to the line 50, the latter line being number 1. If the ends of two pipes are to be brought together at an angle of 90°, the joint between them lies at an angle of 45°, so that, the arm 20 is set at 45° to the base 28. Then the distance from G to the point where its line 21 intersects the edge or any straight line, such as the line L, of the base is transferred to lines 1 and 13 of the stretch-out. These distances may be transferred to the stretch-out in any convenient manner, such as by means of dividers or compasses. Similarly, the distances of the other lines 21 are transferred as follows:

F–L to lines 2 and 12
E–L to lines 3 and 11
D–L to lines 4 and 10
C–L to lines 5 and 9
B–L to lines 6 and 8
A–L to line 7

The points 52 on the lines of the stretch-out are now joined by a symmetrical curve 53. When the template material is cut along the curved line 53, the template is formed for the end of the pipe.

If the pipe ends are to be brought together at any angle other than 90° and the angle is divided between the two pipes, the arm 20 is set at an angle equal to one half of the full angle, as in the case of the 90° angle. However, if one pipe comes in at a desired angle to the other pipe, the arm 20 is set at the full angle. In the latter case, when the angle is, say for example, 60°, the procedure is as follows:

The stretch-out 47 is made as described above. However, the points 55 are not located in exactly the same manner as the points 52. If it is a 60° joint, the arm 20 is set at 60° in relation to the base 28. Then the distance from G along its line to the point where the latter cuts across line L of the base, said distance being designated G–L, is transferred to lines 1 and 13 of the stretch-out. The remaining points 55 are located by transferring the following distances to the indicated lines:

F–M to lines 2 and 12
E–N to lines 3 and 11
D–O to lines 4 and 10
C–N to lines 5 and 9
B–M to lines 6 and 8
A–L to line 7

The points 55 are joined by a curved line 56, and the material on which the stretch-out is drawn may be cut along the line 56 to form the required template.

The base 28 in the illustrated example may be used for pipes of 4 different diameters. There are two sets of lines 36 on each face of the base, and there are four lines of holes 38, one line for each pipe size. When it is desired to make a template for a hole in a pipe at a pipe joint, a stretch-out 60, see Figure 4, is drawn on the material from which the template is to be made as follows:

Spaced lines 61 and 62 are drawn parallel to each other, and a centre line 63 is drawn at right angles thereto. The line of holes 38 for the pipe of the desired size is selected and the centre hole of said line is placed on the line 61 at the point where the line 63 crosses it. Then points are made on the line 61 through the remaining holes of the selected line 38. Lines 65 may now be drawn through the points on the line 61 parallel with the line 63. These lines may be numbered from left to right as 1 to 7, as shown.

When the hole in the pipe is at a 60° joint, the one described above, the arm 24 of the instrument remains clamped at an angle of 60° to the base. The following distances are obtained from the instrument and transferred to the stretch-out 60. The distances referred to are distances from the line S. R. respectively on the lines L, M, N, O, to the points where lines A to G cut across them. There are actually two sets of distances, that is, the distance from S. R. on lines L, M, N, and O to the points of intersection with lines A, B, C, D, and the distance from S. R. on lines O, M, N, L, to the points of intersection with lines D, E, F, G. The lines of one set are shorter than the corresponding lines of the other set, and the shorter lines are placed on the stretch-out below the line 61. The distances transferred are as follows:

S. R.—A–L to line 4
    S. R.—M–B to lines 3 and 5
    S. R.—N–C to lines 2 and 6
    S. R.—O–D to lines 1 and 7
    S. R.—N–E to lines 2 and 6
    S. R.—M–F to lines 3 and 5
    S. R.—L–G to line 4

Curved lines 68 and 69 joining the points above and below the line 61 define the hole to be cut in the template for the pipe hole.

From the above it will be seen that this instrument may be used for making templates for the ends of pipes coming in at an angle to other pipes, and for cutting the holes in the pipes at these joints. The lines 21 and graduations 24 of the arm of the arm 20 are made for a pipe of a given diameter. Thus, it is necessary to have different arms for pipes of different diameters. The base of the instrument described above may be used for pipes of 4 different diameters. For example, the sets of lines 36a and 36b shown in Figures 1 and 2 may be used with the illustrated arm 20. The arm is used in connection with the set of lines 36a in the manner shown in Figure 1. When it is desired to use the arm with the set of lines 36b, the arm is removed from the base, turned over, and replaced. In this case the arm is to be transparent so that the markings on one surface thereof may be seen when viewed from the opposite surface. In addition to this, the illustrated arm may be used with either of the sets of lines 36 on the opposite face of the base. The instrument may be used for a pipe coming in at any angle to another pipe from 90° down to the smallest practical angle.

All the markings on the arm and base of the instrument may be such as to allow for thicknesses of metal, the thickness of the material from which the template is cut, and for any spacing which may be required for welding. However, the markings on the instrument may be mathematically accurate so that it may be used by a draftsman when making drawings of pipe lay-outs and the like.

What I claim as my invention is:

1. A lay-out instrument for pipes and the like comprising an elongated base having a plurality of unequally spaced parallel lines extending longitudinally thereof, and an arm pivotally mounted on the base having a plurality of unequally spaced parallel longitudinal lines extending at right angles to a line running through its pivot, the lines of the base and of the arm representing equally spaced lines on pipe surfaces curved transversely of said lines, and each of said arm lines being positioned to reach at least one of the base lines when the arm is set at any operative angle in relation to the base, whereby movement of the arm changes the angles of all its lines to the base lines.

2. A lay-out instrument for pipes and the like comprising an elongated base having a plurality of unequally spaced parallel lines extending longitudinally thereof, an arm pivotally mounted adjacent one end on an end of the base and having a plurality of unequally spaced parallel longitudinal lines extending at right angles to a line running through its pivot, the lines of the base and of the arm representing equally spaced lines on pipe surfaces curved transversely of said lines, and means at the arm pivot for removably retaining the arm in any adjusted position in relation to the base, each of said arm lines being positioned to reach at least one of the base lines when the arm is set at any operative angle to the base, whereby movement of the arm changes the angle of all its lines of the base lines.

3. A lay-out instrument for pipes or the like as claimed in claim 2 including a line on the base running at right angles to the specified line on the latter and through the pivot of the arm, and in which the pivot point of the arm is adjacent but spaced from one end thereof, and in which the arm includes protractor graduations at its short end with the pivot point as the centre thereof, the zero graduation extending at right angles to the base line, and said graduations being adapted to co-act with the base line running through the arm pivot to indicate angular settings of the arm.

4. A lay-out instrument for pipes and the like comprising an elongated base having a plurality of unequally spaced parallel lines extending longitudinally thereof, and an arm pivotally mounted on the base having a plurality of unequally spaced parallel longitudinal lines extending at right angles to a line running through its pivot, the lines of the base and of the arm representing equally spaced lines on pipe surfaces curved transversely of said lines, and each of said arm lines being positioned to reach at least one of the base lines when the arm is set at any operative angle in relation to the base, and said base having at least one line of unequally spaced holes representing the markings for the ordinate lines on a stretch-out for a hole in a given pipe, whereby movement of the arm changes the angles of all its lines to the base lines.

5. A lay-out instrument for pipes or the like as claimed in claim 2 including a line on the base running at right angles to the lines on the latter and through the pivot of the arm, and in which the pivot point of the arm is adjacent but spaced from one end thereof, and in which the arm includes protractor graduations at its short end with the pivot point as the centre thereof, the zero graduation extending at right angles to the base lines, and said graduations being adapted to co-act with the base line running through the arm pivot to indicate angular settings of the arm.

6. A lay-out instrument for pipes and the like comprising an elongated base having a plurality of unequally spaced parallel lines extending longitudinally thereof, and another line running across said lines adjacent one end of the base, and an arm pivotally mounted on the base at the line extending across the latter and having a plurality of unequally spaced parallel longitudinal lines extending at right angles to a line running through its pivot, the lines of the base and of the arm representing equally spaced lines on pipe surfaces curved transversely of said lines, and each of said arm lines being positioned to reach at least one of the base lines when the arm is set at any operative angle in relation to the base, whereby movement of the arm changes the angles of all its lines to the base lines.

7. A lay-out instrument for pipes and the like comprising a base having a straight line thereon, and an arm pivotally mounted on the base having a transverse line and a central longitudinal line extending through its pivot, said arm also having an equal number of side lines extending parallel to the central line on both sides of the latter, said side lines getting closer to each other from the centre line towards each side of the arm to represent equally spaced lines on a pipe surface curved transversely of said lines, and said arm lines being positioned to reach the base line when the arm is set at any operative angle in relation to the base, whereby movement of the arm changes the angle of all its lines to the base line.

8. A lay-out instrument for pipes and the like comprising a base having a straight line thereon, and an arm pivotally mounted on the base having a transverse line and a central longitudinal line extending through its pivot, said arm also having an equal number of side lines extending parallel to the central line on both sides of the latter, said side lines getting closer to each other from the centre line towards each side of the arm to represent equally spaced lines on a pipe surface curved transversely of said lines, and means at the arm pivot for removably retaining the arm in any adjusted position in relation to the base, said arm lines being positioned to reach the base line when the arm is set at any operative angle to the base, whereby movement of the arm changes the angle of all its lines to the base line.

9. A lay-out instrument for pipes and the like comprising a base having a straight line thereon, and an arm pivotally mounted on the base having a transverse line and a central longitudinal line extending through its pivot, said arm also having an equal number of side lines extending parallel to the central line on both sides of the latter, said side lines getting closer to each other from the centre line towards each side of the arm to represent equally spaced lines on a pipe surface of a given diameter curved transversely of said lines, said lines being positioned to reach the base line when the arm is set at any operative angle in relation to the base, and said arm having a plurality of numbered graduations along one edge thereof representing the markings for the ordinate lines on a stretch-out for said given pipe, whereby movement of the arm changes the angle of all its lines to the base line.

JAMES ARTHUR CAMERON.

References Cited in the file of this patent

UNITED STATES PATENTS

| Number | Name | Date |
|---|---|---|
| 397,132 | Kimball | Feb. 5, 1889 |
| 678,018 | McFarland | July 9, 1901 |
| 776,713 | Wurts | Dec. 6, 1904 |
| 811,625 | Edmonds | Feb. 6, 1906 |
| 870,520 | Palm | Nov. 5, 1907 |
| 1,172,510 | Williamson | Feb. 22, 1916 |
| 1,483,935 | Golden | Feb. 19, 1924 |
| 1,568,876 | Campbell et al. | Jan. 5, 1926 |
| 2,272,860 | Wolfe | Feb. 10, 1942 |
| 2,327,058 | O'Keefe | Aug. 17, 1943 |

OTHER REFERENCES

Publ.: Atkins, Practical Sheet and Plate Metal Work, pages 12–13; published by Whittaker & Co. in 1908.